United States Patent
Strzalka et al.

(10) Patent No.: US 12,416,458 B2
(45) Date of Patent: Sep. 16, 2025

(54) HEAT EXCHANGER MANIFOLD

(71) Applicant: B/E Aerospace, Inc., Winston-Salem, NC (US)

(72) Inventors: Boguslaw Strzalka, Nysa (PL); Adrian Tarnowski, Wrocław (PL)

(73) Assignee: B/E AEROSPACE, INC., Winston Salem, NC (US)

( * ) Notice: Subject to any disclaimer, the term of this patent is extended or adjusted under 35 U.S.C. 154(b) by 109 days.

(21) Appl. No.: 17/499,086

(22) Filed: Oct. 12, 2021

(65) Prior Publication Data

US 2022/0128324 A1    Apr. 28, 2022

(30) Foreign Application Priority Data

Oct. 28, 2020 (EP) .................................. 20461576

(51) Int. Cl.
  *F28F 9/02* (2006.01)
  *B64D 13/06* (2006.01)
(52) U.S. Cl.
  CPC ............ *F28F 9/0268* (2013.01); *B64D 13/06* (2013.01); *B64D 2013/0688* (2013.01)
(58) Field of Classification Search
  CPC ...... F28F 9/0268; F28F 9/0243; B64D 13/06; B64D 2013/0688; B64D 13/00; F28D 9/0056; F28D 9/0037; F28D 2021/007
  See application file for complete search history.

(56) References Cited

U.S. PATENT DOCUMENTS

| | | | |
|---|---|---|---|
| 3,628,882 A * | 12/1971 | Nilsson | A47L 5/22 415/199.2 |
| 5,379,832 A | 1/1995 | Dempsey | |
| 7,911,791 B2 * | 3/2011 | Refai-Ahmed | H01L 23/467 361/695 |
| 8,120,915 B2 | 2/2012 | Pautsch et al. | |
| 8,988,881 B2 * | 3/2015 | Koplow | F04D 25/066 165/122 |
| 9,445,524 B2 * | 9/2016 | Lofy | H05K 7/20845 |
| 10,692,798 B2 * | 6/2020 | Azar | F28F 3/02 |
| 10,993,351 B2 * | 4/2021 | Tang | F28F 13/06 |

(Continued)

FOREIGN PATENT DOCUMENTS

CN  101203117 A  6/2008
EP  2541180 A1  1/2013

(Continued)

OTHER PUBLICATIONS

European Search Report for Application No. 20461576.9, mailed Apr. 13, 2021, 7 pages.

*Primary Examiner* — Gordon A Jones (74) *Attorney, Agent, or Firm* — CANTOR COLBURN LLP (57) ABSTRACT

A manifold for a heat exchanger includes a manifold body configured to house heat exchanger components including a blower for circulating air and means for performing heat exchange between the air and a heat exchange fluid. The manifold also includes an opening (A) via which air enters the blower, an inlet for receiving air from the heat exchanger and an outlet for outputting air from the manifold. The manifold also includes a flow channel extending between the inlet and the outlet. The channel defines a helical flow path from the inlet to the outlet.

6 Claims, 7 Drawing Sheets

(56) References Cited

U.S. PATENT DOCUMENTS

| | | | |
|---|---|---|---|
| 11,686,536 B2 * | 6/2023 | Savlers | H01L 23/467 165/80.3 |
| 2010/0170657 A1 | 7/2010 | Kaslusky | |
| 2013/0040546 A1 * | 2/2013 | Noske | B64D 11/0647 454/76 |
| 2014/0090829 A1 * | 4/2014 | Petrovski | B60N 2/5635 62/3.61 |
| 2015/0330718 A1 | 11/2015 | St. Rock et al. | |
| 2017/0023317 A1 * | 1/2017 | Zhang | H01L 23/473 |
| 2019/0388818 A1 * | 12/2019 | Martin | B01D 45/16 |
| 2020/0300498 A1 * | 9/2020 | Lopatinsky | F04D 17/04 |

FOREIGN PATENT DOCUMENTS

| | | |
|---|---|---|
| EP | 3273174 A1 | 7/2017 |
| EP | 3486595 A1 | 11/2018 |
| EP | 3492858 A1 | 12/2018 |
| WO | 9958907 | 11/1999 |
| WO | 2019073277 A1 | 4/2019 |

* cited by examiner

HEAT EXCHANGER MANIFOLD

CROSS-REFERENCE TO RELATED APPLICATIONS

This application claims priority to European Patent Application No. 20461576.9 filed Oct. 28, 2020, the entire contents of which is incorporated herein by reference.

TECHNICAL FIELD

The present disclosure is concerned with heat exchangers and, in particular, manifolds for heat exchangers.

BACKGROUND

Heat exchangers are used in many applications where a gas or liquid is to be heated or cooled. Various structures are known but these usually include a pathway for the gas or liquid to be heated or cooled and heat transfer gas or liquid that exchanges heat with the gas or liquid to be heated or cooled as it flows through the pathway such that at the outlet of the heat exchanger a heated or cooled gas/liquid is output.

Examples of where heat exchangers are used include air conditioning systems in buildings, cooling in electronics systems, aircraft sub-system cooling, environmental cooling systems in aircraft etc.

An example heat exchanger is described in US2015/0330718.

The heat exchanger components are generally mounted in a housing or a manifold so that the heat exchanger can be located where the heat exchange function is required. In some cases, the manifold will connect the heat exchanger with another system that uses the heated or cooled gas/liquid.

In some areas where heat exchangers are used, space is restricted and it is desirable or necessary to minimise the dimensions of the heat exchanger to meet the space restrictions. On the other hand, it is necessary to ensure the required flow parameters and output are still met. These two requirements may be conflicting design objectives. The required output may dictate the size and structure of the heat exchange components and so it is necessary to consider the design of the manifold to satisfy dimensional criteria.

One area where heat exchangers are used is in aircraft heating and cooling systems. Aircraft cabins generally have their air temperature regulated for the safety and comfort of passengers by an environmental conditioning system (ECS) that is controlled to ensure that the cabin air is clean and fresh and at the required temperature. In addition, passengers have air vents or blowers in the panel above their heads to provide additional cooling to the individual passenger as required.

Passengers in business class or first class seats may also have individual heaters/coolers positioned under their seats. These passengers are able to adjust the temperature of the environment around their seat individually.

Whilst, as mentioned above, in aircraft the ECS operates to keep the cabin air comfortable, the fuel cost to cool the cabin air with conventional ECS systems is high. Where an aircraft is, for example, not full or where some passengers do not actually want or need the air temperature to be cooled to a given temperature, this is a wasted expense.

Design consideration is currently being given to increasing the efficiency of aircraft systems including reducing the fuel consumed in operating the ECS. Various ECS systems have been developed that e.g. use recirculated cabin air or other methods to reduce fuel consumption. Another way of reducing fuel consumption of the ECS that is currently being considered is to allow the cabin temperature to actually be higher than has conventionally been selected.

A problem with this approach is that the higher cabin temperature might not be comfortable or optimal for every passenger.

As mentioned above, in some aircraft, passengers in areas of the cabin where the passenger has a relatively large seat space e.g. in business or first class may have their own individual air conditioning devices. These are usually in the form of a heat exchanger unit for example as described above, mounted in a manifold and located under the passenger's seat. The manifold usually has a number of outlets for the cooled or warned air to exit to the seating area of the passenger. The manifold generally houses the heat exchanger components and has a flow channel for the air that has undergone heat exchange. The flow channel starts at an inlet which collects air from the heat exchanger, the channel then follows a circular path around the blower and has one or more outlets circumferentially offset with respect to the circular path from the inlet. The circular flow path may extend more than 360 degrees forming concentric circles around the blower. The overall width of the manifold is defined by the dimensions of the flow channel and the number for turns the channel makes around the blower—the more turns, the greater the width.

In business class and first class or similar parts of the aircraft cabin, there is generally enough space under the seat for a manifold of large enough surface area to provide sufficient temperature control to the passenger. In other parts of the cabin, such as economy class, for example, the seats are less wide and there is not sufficient area under the seats for the sorts of units currently used in the higher/more expensive class seat areas. This means that it is not feasible to have such individual environment control units under every passenger seat and so it has not been feasible to introduce fuel saving ECSs in aircraft that result in a higher overall cabin air temperature.

There is a need for a heat exchanger structure that allows for effective temperature control while taking up as small an area as possible.

SUMMARY

According to the disclosure, there is provided a manifold for a heat exchanger, comprising: a manifold body configured to house heat exchanger components including a blower for circulating air and means for performing heat exchange between the air and a heat exchange fluid, the manifold comprising an opening via which air enters the blower and further comprising an inlet for receiving air from the heat exchanger and an outlet for outputting air from the manifold and a flow channel extending between the inlet and the outlet, the channel defining a helical flow path from the inlet to the outlet.

A guide fin may be located in the channel configured to guide the air along the helical flow path.

The channel may extend more than one full turn around the heat exchanger components to define the helical flow path.

In some examples, the manifold is mounted around a heat exchanger which, may be circular and, for example, includes a blower and a plurality of heat exchange fins through which air is directed by the blower and where heat exchange takes place.

The unit has particular advantages for fitting under a seat in a vehicle e.g. in an aircraft but can have advantages in other applications where space is limited.

DETAILED DESCRIPTION

The examples shown in the drawings and described in detail herein comprise a manifold 1 for a heat exchanger 2 having a blower 3 that has a substantially circular form, and a plurality of heat exchanger fins 4. Air indicated by arrow A is drawn into the blower 3 at an input 9 and is directed from the blower into the fins 4. This may be e.g. fresh air or, in an aircraft, may be recirculated cabin air. Heat exchange fluid (not shown) may be passed through the fins. As the air is directed by the blower across the fins 4, heat exchange takes place between the heat exchange fluid and the air. Depending on the direction of heat exchange, the air is warmed or cooled by the heat exchange process. The warmed or cooled air then exits the heat exchange components via one or more outlets as indicated by arrow B. The present disclosure is, however, not limited to such heat exchanger structures and the manifold described further herein may house different heat exchange components that take in air, perform a heat exchange process on the air, and output cooled or heated air.

Figure 5A:
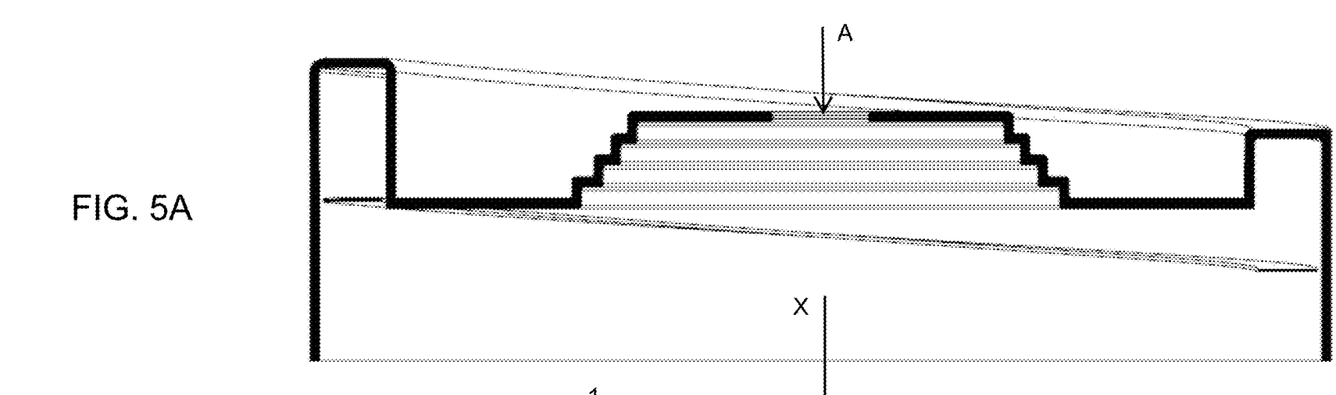
FIGS. 5A and 5B are side sectional view of the unit of FIG. 1.
Figure 5B:
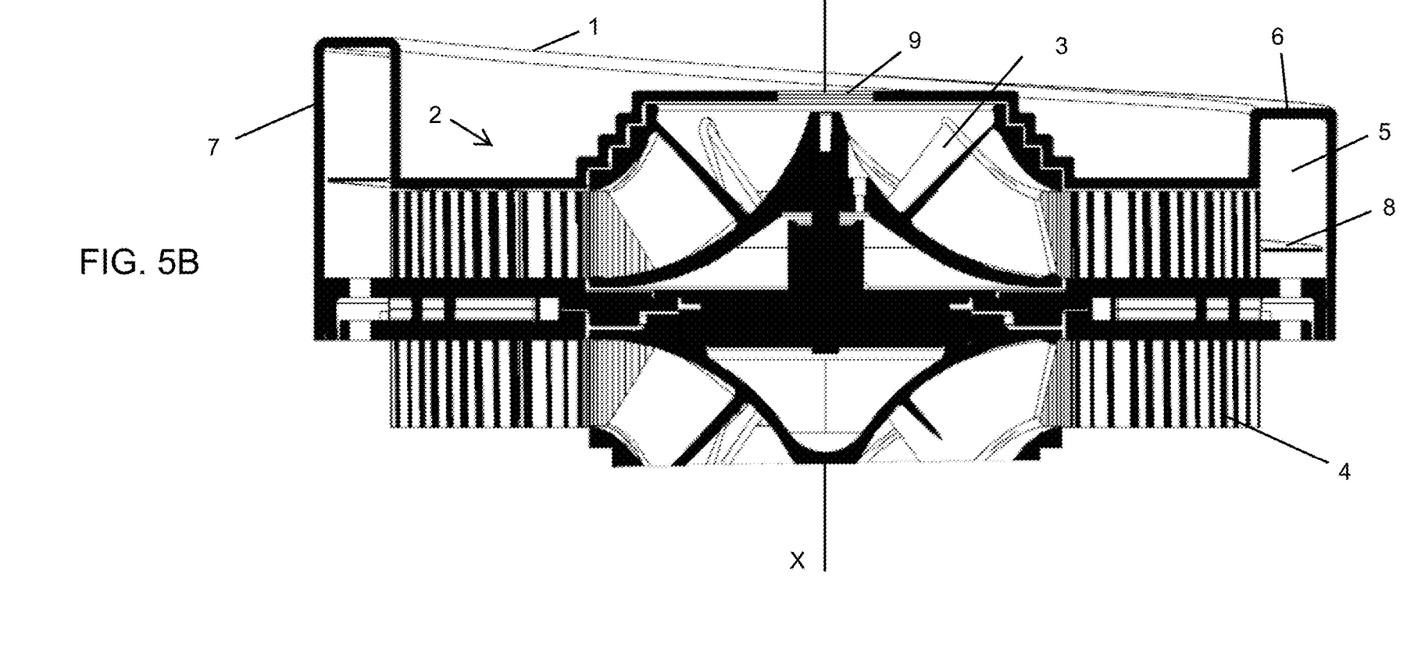
Figure 6:
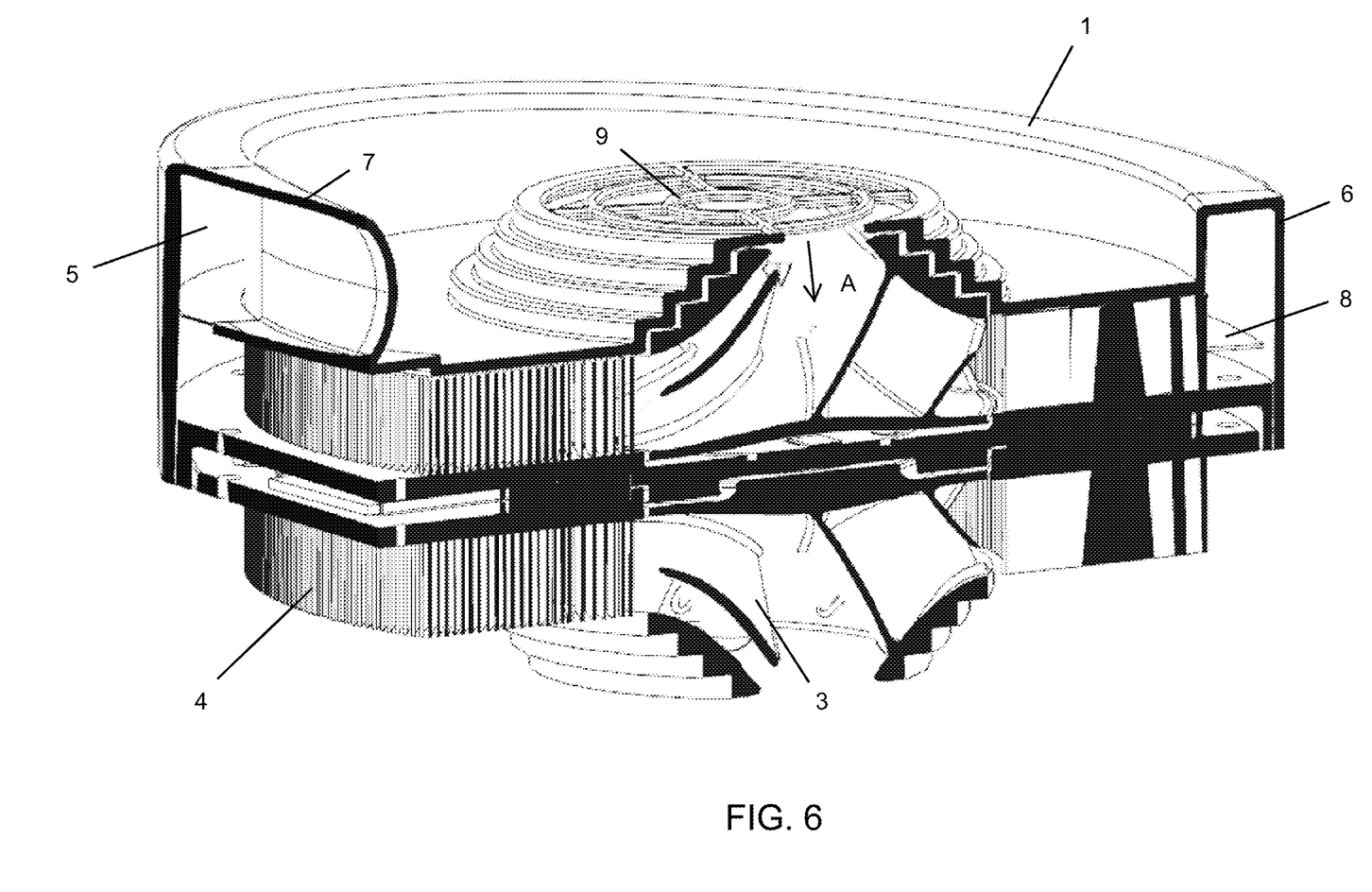
FIG. 6 is a perspective exposed view of the unit of FIG. 1.
Figure 7:
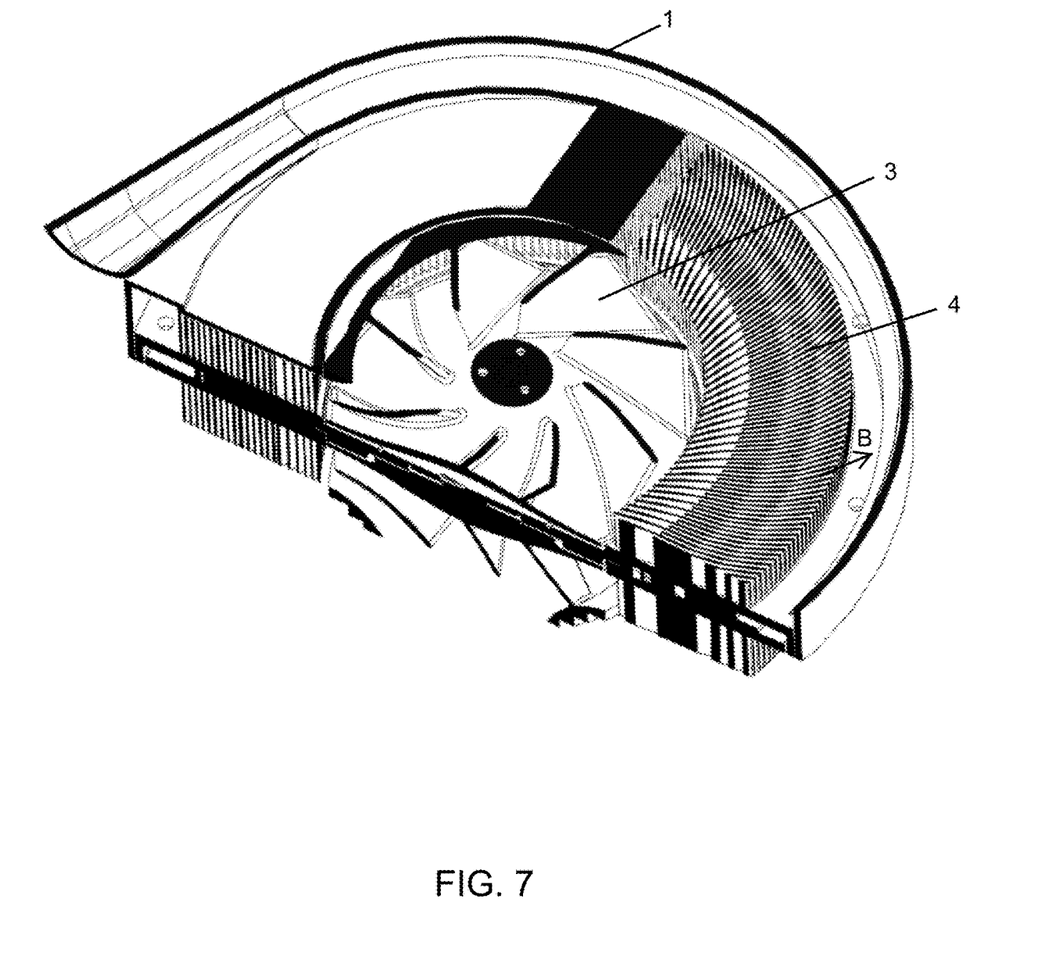
FIG. 7 is an alternative perspective exposed view of the unit of FIG. 1.

The heat exchanger components are housed in the manifold 1. The manifold is designed to minimise the area taken up by the heat exchanger unit 10. In order to achieve required flow and power, there is little flexibility in the design of the size of the components required to perform the heat exchange e.g. the blower and fins. The present disclosure therefore aims to minimise the area of the unit 10 by appropriate design of the manifold 1. The manifold surrounds the heat exchanger 2 components and defines a channel 5 having an inlet 6 arranged to receive air from the heat exchanger components after the heat exchange process and an outlet 7 via which the heated or cooled air is expelled into the environment e.g. the aircraft cabin around an individual seat. The channel has a helical configuration from the inlet 6 to the outlet 7 such that with respect to an axis X defined through the centre of the blower from top to bottom, the inlet is axially offset with respect to the outlet, as best seen in FIG. 5B.

The channel 5 may be of such a length that it extends by more than 360 deg. around the blower 3. Because the channel is helical, the additional turns will not, or will to a lesser extent that a circular arrangement, add to the radial dimension R of the manifold, but rather to its height or axial dimension H.

The helical structure allows the manifold to have only a single outlet 7 which allows easier installation of the unit 10 where the outlet air is required such as under a seat in an aircraft.

Figure 1:
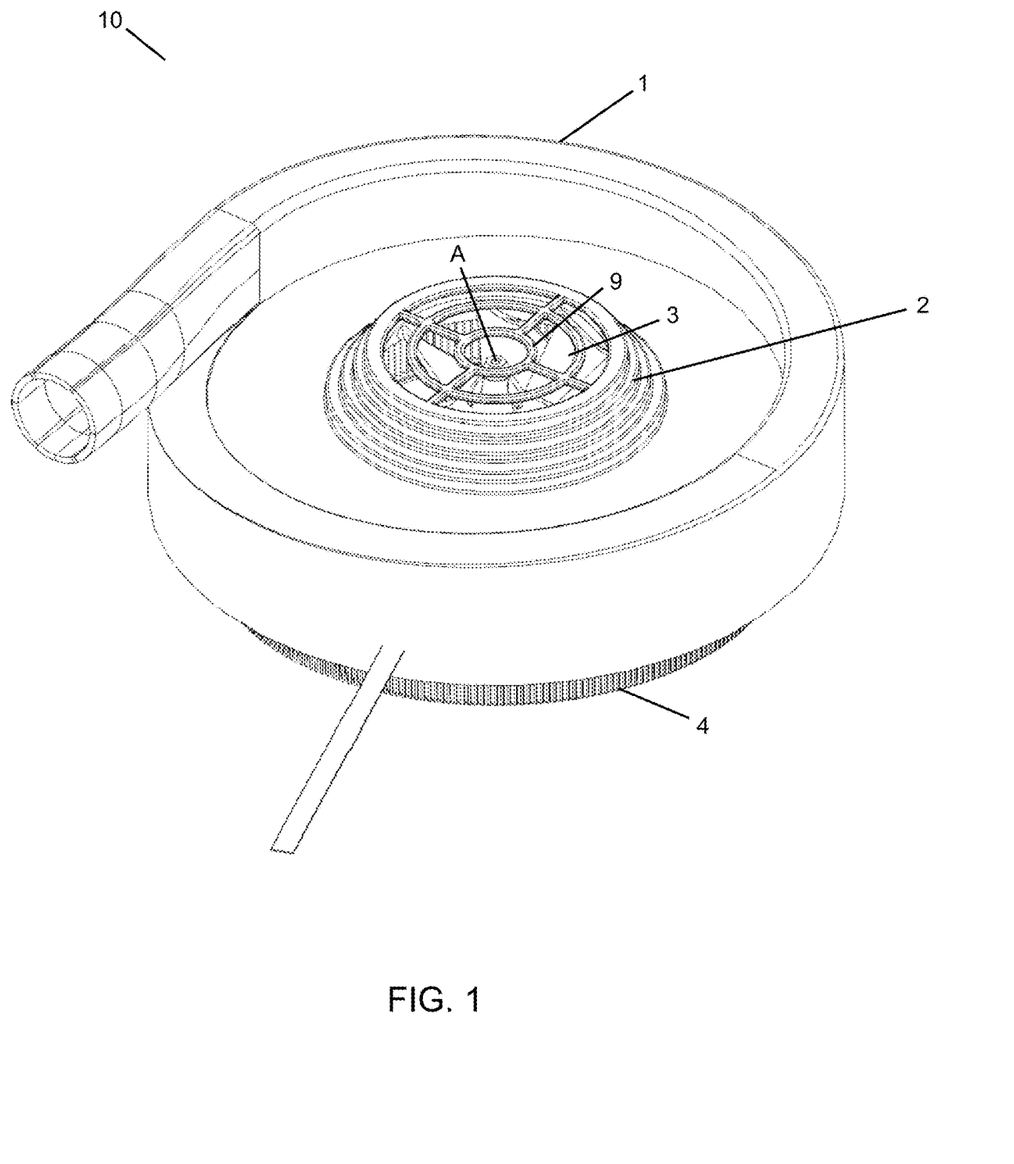
FIG. 1 is a perspective view of a heat exchanger unit having a manifold in accordance with this disclosure.
Figure 2:
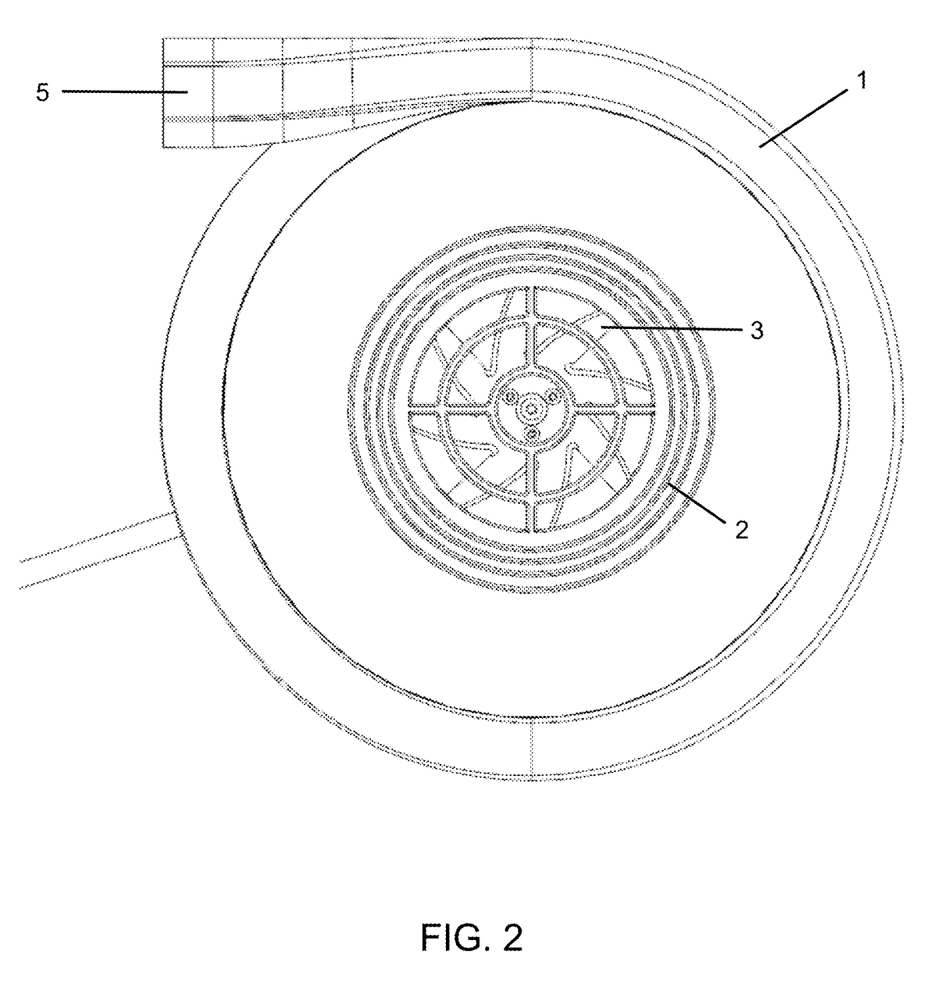
FIG. 2 is a top view of the unit of FIG. 1.
Figure 3:
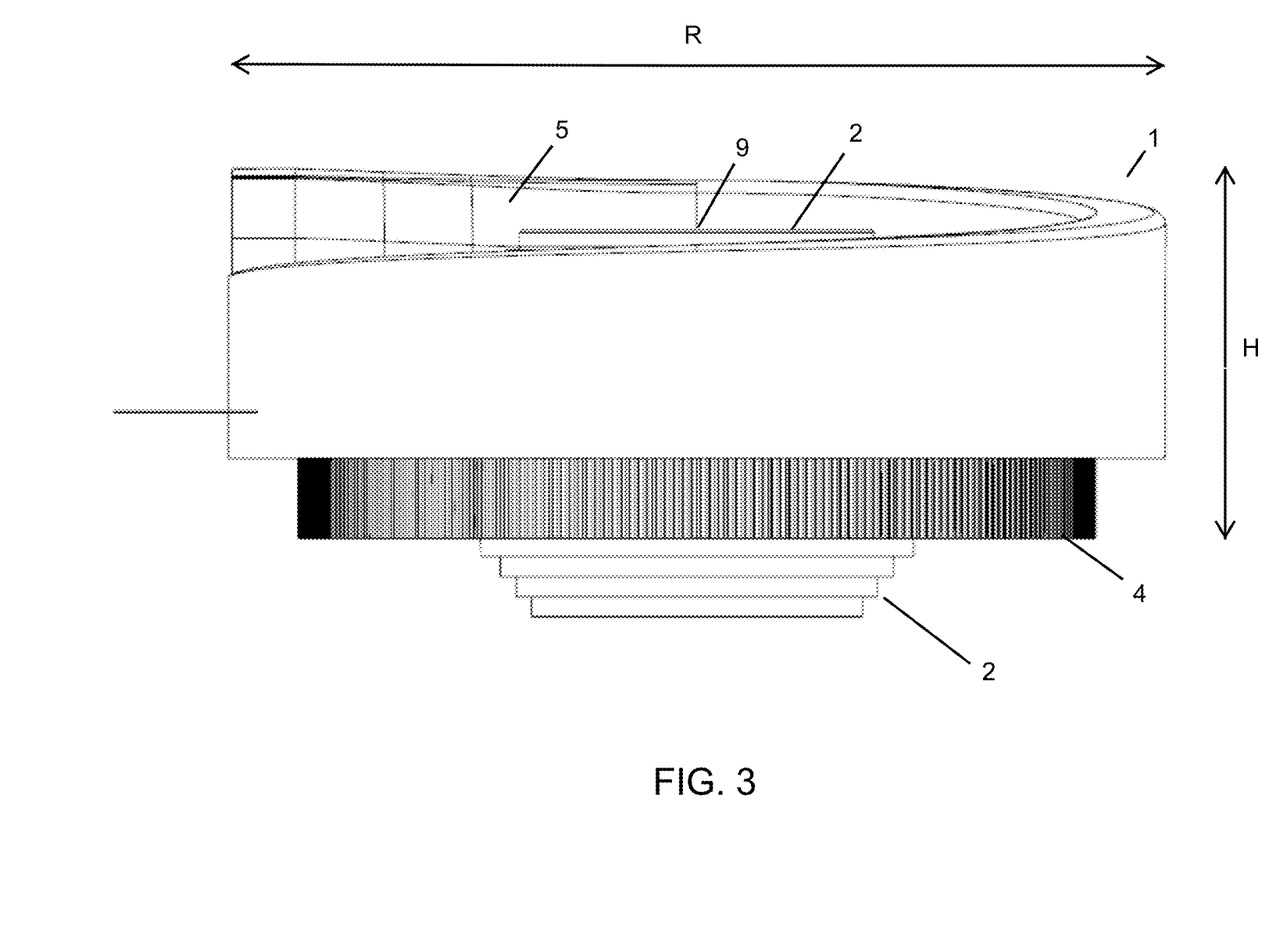
FIG. 3 is a side view of the unit of FIG. 1.
Figure 4:
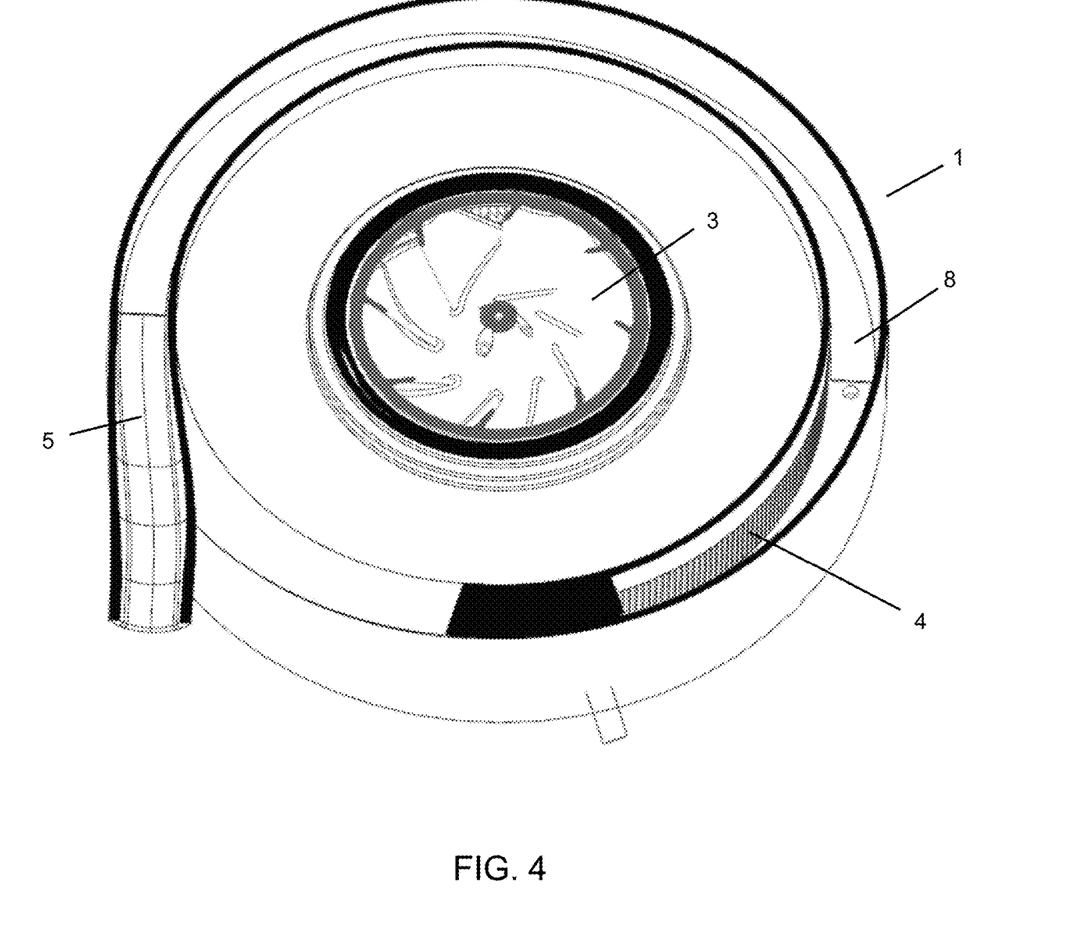
FIG. 4 is a partially exposed perspective view of the unit of FIG. 1.

In a preferred arrangement, in order to prevent inlet and outlet air mixing in the manifold, e.g. due to air recirculating at the lower part of the manifold, a special fin 8 separates the part of the manifold driving air to the outlet. An example of the fin can be best seen in FIGS. 4 and 5B where it can be seen that the fin separates the channel 5 and guides the outlet air up through the helix to the outlet 7.

The manifold having a three dimensional helical structure with a single outlet can be manufactured as a plastic component using additive manufacturing which substantially decreases the cost and time to manufacture.

Because the channel forms a helical path rather than a circular path, the radial dimension of the manifold and hence the unit is smaller than a conventional arrangement providing the same flow parameters. Instead, the flow path has an increased dimension in the axial direction (i.e. is higher) than a convention arrangement providing the same flow parameters. Such a manifold allows the unit to be used in locations where the available surface area is restricted but where more height might be available such as under the seats of an aircraft in economy class.

Whilst the manifold has been described in the context of a heat exchange unit for an aircraft, the disclosure is not so limited. The advantages provided by the manifold structure of this disclosure will be useful anywhere where a heat exchanger is to be installed in a space where the axial dimension is limited. The scope of the disclosure is limited only by the claims.

The invention claimed is:

1. A heat exchanger comprising:
   a plurality of heat exchange fins;
   a blower configured to draw air into the heat exchanger and cause the air to pass through the heat exchange fins in use;
   a manifold body surrounding the blower and the heat exchange fins, wherein the manifold body includes an opening arranged such that air can enter the blower;
   the manifold body further comprising:
   an inlet arranged such that in use air that passes through the fins is received at the inlet;
   an outlet for outputting air from the manifold body; and
   a flow channel extending between the inlet and the outlet, the channel defining a helical flow path from the inlet to the outlet;
   wherein the heat exchanger has a substantially circular cross-section.

2. The heat exchanger of claim 1, wherein the manifold further includes:
   a guide fin located in the channel configured to guide the air along the helical flow path.

3. The heat exchanger of claim 2, wherein the channel extends more than one full turn around the heat exchanger components to define the helical flow path.

4. The heat exchanger of claim 1, for installation under a seat.

5. The heat exchanger of claim 4, for installation under a seat of an aircraft.

6. The heat exchanger of claim 5, wherein the heat exchange unit receives recirculated air from the aircraft cabin.

* * * * *